United States Patent
Bruns

(10) Patent No.: US 8,936,011 B2
(45) Date of Patent: Jan. 20, 2015

(54) METHOD FOR IMPOSING VARIABLE LOAD ON THE INTERNAL COMBUSTION ENGINE USED IN VAPOR DESTRUCTION APPLICATIONS

(75) Inventor: Bernhardt R. Bruns, Newport Beach, CA (US)

(73) Assignee: BRB/Sherline, Inc., Coto de Caza, CA (US)

( * ) Notice: Subject to any disclaimer, the term of this patent is extended or adjusted under 35 U.S.C. 154(b) by 14 days.

(21) Appl. No.: 13/409,546

(22) Filed: Mar. 1, 2012

(65) Prior Publication Data

US 2012/0222640 A1 Sep. 6, 2012

Related U.S. Application Data

(60) Provisional application No. 61/449,543, filed on Mar. 4, 2011.

(51) Int. Cl.
| | | |
|---|---|---|
| *F02B 73/00* | (2006.01) | |
| *F02B 47/04* | (2006.01) | |
| *B01D 53/72* | (2006.01) | |

(52) U.S. Cl.
CPC ............ *B01D 53/72* (2013.01); *F02B 73/00* (2013.01); *B01D 2257/708* (2013.01)
USPC ....... 123/568.11; 123/434; 60/709; 60/605.2; 60/698

(58) Field of Classification Search
CPC .......... F01B 21/00; F01B 21/02; F01B 47/00; F01B 47/04; F01B 43/10; F01B 71/00; F01B 65/00; F01B 73/00; F01B 53/14; F02D 25/00; B60W 10/02–10/023
USPC ...................... 123/568.11; 60/605.2, 709, 698
See application file for complete search history.

(56) References Cited

U.S. PATENT DOCUMENTS

| | | | | |
|---|---|---|---|---|
| 2,589,788 | A | * | 3/1952 | Fell ................................... 477/6 |
| 3,656,915 | A | | 4/1972 | Tourtellotte |
| 3,947,544 | A | | 3/1976 | Yamada et al. |
| 4,116,006 | A | * | 9/1978 | Wallis ............................. 60/709 |
| 5,035,117 | A | | 7/1991 | Drake |
| 5,435,141 | A | | 7/1995 | Rose |
| 5,456,240 | A | | 10/1995 | Kanesaka |
| 5,519,992 | A | | 5/1996 | Hosoya et al. |

(Continued)

FOREIGN PATENT DOCUMENTS

| | | |
|---|---|---|
| DE | 4020990 | 1/1991 |
| DE | 102010023082 | 12/2011 |

(Continued)

OTHER PUBLICATIONS

Jun. 4, 2012 International Search Report and Written Opinion for PCT Application No. PCT/US2012/027321 filed on Mar. 1, 2012, the PCT counterpart of the current application.

(Continued)

*Primary Examiner* — Lindsay Low
*Assistant Examiner* — Kevin Lathers
(74) *Attorney, Agent, or Firm* — Knobbe Martens Olson & Bear LLP

(57) ABSTRACT

A method of imposing a variable load upon the internal combustion engine as it is typically used in the performance of degassing operations includes coupling a crankshaft of the internal combustion engine to a secondary internal combustion engine.

25 Claims, 3 Drawing Sheets

One 4X4 Truck Does it All ...Faster!

(56) References Cited

U.S. PATENT DOCUMENTS

| | | |
|---|---|---|
| 5,753,188 A | 5/1998 | Shimoda et al. |
| 5,890,365 A | 4/1999 | Sisti |
| 6,095,101 A * | 8/2000 | Pedersen .................. 123/27 GE |
| 6,295,973 B1 | 10/2001 | Yang |
| 6,543,398 B1 | 4/2003 | Roberts, Jr. et al. |
| 6,564,545 B1 | 5/2003 | Dong |
| 6,786,209 B2 | 9/2004 | Stewart |
| 7,721,541 B2 | 5/2010 | Roberts, Jr. et al. |
| 7,792,626 B2 * | 9/2010 | Eriksson et al. .............. 701/102 |
| 8,046,989 B2 | 11/2011 | VanderGriend et al. |
| 8,336,302 B2 | 12/2012 | Nakahira |
| 8,429,896 B2 | 4/2013 | Pekrul et al. |
| 2002/0100277 A1 | 8/2002 | Youn |
| 2006/0053776 A1 | 3/2006 | Ancimer et al. |
| 2006/0179824 A1 | 8/2006 | Roser |
| 2012/0240555 A1 | 9/2012 | Bruns |

FOREIGN PATENT DOCUMENTS

| | | |
|---|---|---|
| FR | 2 900 964 | 11/2007 |
| GB | 1359660 | 7/1974 |
| GB | 1 518 132 | 7/1978 |
| JP | 08-028253 A | 1/1996 |
| JP | 10-009039 | 1/1998 |
| JP | 2005/319452 | 11/2005 |
| WO | WO 2005/008031 | 1/2005 |
| WO | WO 2008/050463 | 5/2008 |

OTHER PUBLICATIONS

Jul. 5, 2012 PCT Search Report and Written Opinion for PCT Application No. PCT/US2012/029989 filed on Mar. 21, 2012.

* cited by examiner

METHOD FOR IMPOSING VARIABLE LOAD ON THE INTERNAL COMBUSTION ENGINE USED IN VAPOR DESTRUCTION APPLICATIONS

PRIORITY

The present application claims the benefit of U.S. Provisional Application No. 61/449,543, filed Mar. 4, 2011, the disclosure of which is hereby incorporated by reference herein in its entirety.

BACKGROUND OF THE INVENTION

1. Field of the Invention

The present invention relates to a system and method for controlling emission of Volatile Organic Compounds (VOCs) and, more specifically, to an improved system and method for controlling VOC emissions by combustion of such emissions in an internal combustion engine.

2. Description of the Related Art

The direct release of Volatile Organic Compounds into the atmosphere has been for some time now recognized as a primary contributing factor in affecting ozone levels in the lower atmosphere. The EPA has established standards for safe levels of ozone, and local air quality districts have implemented regulations and mandated control measures pertaining to the release of hydrocarbon vapors into the atmosphere, from operations such as soil remediation and storage tank inerting, and storage vessel loading and unloading; that have been identified as sources of hydrocarbon emissions responsible for impacting ozone levels.

The process of treating these vapors, through any of a variety of methods, is typically referred to as degassing; which is either the collection or on-site destruction of these vapors as an environmentally responsible alternative to their otherwise direct release into the atmosphere.

The internal combustion engine, as well as open-flare incinerator units, has been employed for several decades as a means of on-site destruction of these Volatile Organic Compounds by elemental combustion. The combustion process does give rise to the undesirable production of carbon monoxide and nitrogen oxides; however this has been accepted as a reasonable consequence for the nearly 99% efficiency in the destruction of hydrocarbon based VOC's. These consequential emissions are accepted, but tolerated only to a regulated extent, and are also a factor to be considered in engines and incinerators employed in vapor destruction applications.

Combustion efficiency is often of equal importance to that of volumetric throughput in internal combustion engines employed in vapor destruction applications. For example, many of the Volatile Organic Compounds being the subject of treatment were never intended for use as a motor fuel. At one extreme of the range are the lighter C2 through C7 aliphatic or branched hydrocarbons and their corresponding alcohols; that tend to exhibit lower heating values (btu/cu ft) yet higher octane ratings than their contrasting counterparts such as gasoline with a substantially higher heating value yet lower octane rating ; rendering these later compounds more susceptible to abnormal combustion and undesirable emissions. This is a particular concern involving combustion within the internal combustion engine versus that of the open-flare incinerator type unit.

In the case of the open-flare incinerator type unit, all of the energy derived from the combustion process is emitted as thermal energy. In the case of the internal combustion engine, a certain portion of the energy is dissipated through the engine cooling system; however a considerable amount remains as mechanical energy at the end of the rotating crankshaft. The maximum achievable volumetric throughput of the internal combustion engine is limited by the amount of produced horsepower that can be put to use at the flywheel.

Various methods have been employed throughout the past in an effort to impose a load at the engine flywheel such to match the power output in an effort to provoke the engine to realize its ideal potential volumetric throughput. Amongst these methods, has been the coupling of external devices such as hydraulic pumps, roots blowers, electrical generators and others; in an endeavor to impose some means of load to the rotating crankshaft. One common shortfall in employing such devices, is that their operable range does not match the inherently wider operable range (RPM) of the internal combustion engine; and their employment has served either to limit the maximum RPM of the engine, or otherwise require complex gear reduction type drives necessary to keep the RPM of these ancillary driven loading devices within safe operating speeds.

SUMMARY

One embodiment of a degassing system for controlling emissions of VOC's by combustion of said VOC's in an internal combustion engine comprises a primary internal combustion engine that is connected to a source of VOC's and comprises a crankshaft and a secondary internal combustion engine that also comprises a crankshaft that is coupled to the crankshaft of the primary internal combustion engine.

One embodiment comprises a method of controlling emissions of VOC's in which VOC's are transported to a primary internal combustion engine as a fuel thereof, burning said VOC's in said engine as the fuel, and rotating a crankshaft of a secondary internal combustion engine with a crankshaft of the first internal combustion engine.

Another embodiment comprises a mobile anti-pollution apparatus, for the reduction of hydrocarbon emissions. The apparatus can include a mobile platform upon which is mounted an internal combustion engine, the system comprising a primary internal combustion engine that is connected to a source of VOC's and comprises a crankshaft and a secondary internal combustion engine that also comprises a crankshaft, wherein the crankshafts of the first and second internal combustion engines are coupled together.

Other embodiments and arrangements will be described below.

DETAILED DESCRIPTION OF THE PREFERRED EMBODIMENTS

Figure 1:
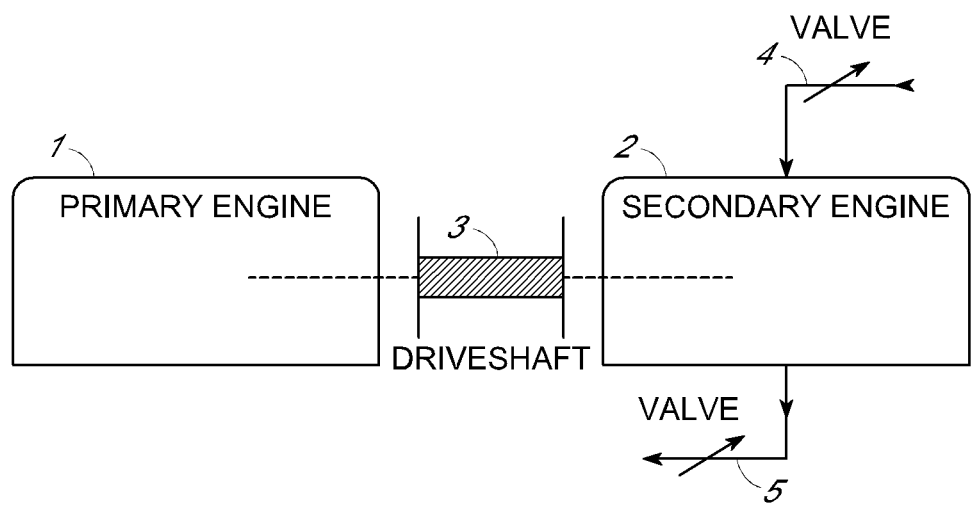
FIG. 1 is a schematic illustration a degassing system according to one embodiment.

As described herein, one embodiment can include improved method of imposing a variable load upon the internal combustion engine as it is used in the performance of degassing operations. As described herein, degassing operations is intended to be a broad term that can be generally defined as the destruction of Volatile Organic Compounds, by elemental combustion, of hydrocarbon vapors emanating from, for example, soil remediation, in situ process streams, pipelines and storage vessels; as an environmentally responsible alternative to the otherwise direct release of these vapors into the atmosphere. In other embodiments, the degassing operations can also be applied to other compounds and/or from sources other than those listed above.

One advantage of certain embodiments is that the system can allow an internal combustion engine to better realize its maximum volumetric throughput potential; but also can include a feature of adjustability that can allow for achieving optimum combustion efficiency in response to the unique combustion characteristics associated with the diverse range of VOC vapors being subject to treatment. Accordingly, a more efficient method of providing a load on the internal combustion engine can be used in vapor destruction applications.

In one embodiment, a degassing system can employ a second internal combustion engine, coupled to a first internal combustion engine, to impose a resistive force in a counter rotative manner to the output of the first internal combustion engine; as a method of imposing a load equivalent to the output of the first internal combustion engine; enabling the first internal combustion engine to operate at or close to its full volumetric flow potential.

The ideal volumetric efficiency of the normally aspirated reciprocating type internal combustion engine is approximately 85% of its calculated displacement. A forced induction engine, depending upon its boost ratio, may perhaps be 120% of its calculated displacement. Both however face the problem that achievement of the full value of this volumetric displacement is dependent upon imposing a load equivalent to the horsepower being produced at the flywheel of the engine performing the vapor destruction operation.

Internal combustion engines typically used for the purpose of VOC destruction are capable of producing flywheel horsepower ratings in the neighborhood of 200 Hp. When perhaps only 50 Hp load is applied to these engines, it can be summarized that the engine can only be allowed to produce no more than this 50 Hp; and therefore (for example), a 500 cubic inch engine capable of a volumetric displacement of 500 cfm, is therefore only realistically capable of a maximum volumetric throughput of 125 cfm in actual service; or roughly 25% of its potential volumetric throughput.

As noted above, combustion efficiency is often equal concern to that of volumetric throughput in internal combustion engines employed in vapor destruction applications. Many of the Volatile Organic Compounds being the subject of treatment were never intended for use as a motor fuel. At one extreme of the range are the lighter C2 through C7 aliphatic or branched hydrocarbons that tend to exhibit lower heating values (btu/cu ft) yet higher octane ratings than their contrasting counterparts such as gasoline which exhibits a comparably higher heating value yet lower octane rating; rendering the later more susceptible to abnormal combustion if excessively loaded.

Certain embodiments described herein can apply the appropriate "loading" by employing a second internal combustion engine so arranged as to resist the normal rotation of the first. This can allow the primary (or first) internal combustion engine responsible for VOC destruction to operate at its maximum ideal volumetric throughput at any given RPM (or at least a larger range of RPM, and Applicant believes this affords a higher operating speed than current methods of loading allow, and affords also a degree of adjustability to the amount of this load at any given RPM to accommodate the unique combustion characteristics of the wide range of VOC's being the subject of treatment. An overall analysis is the conversion of rotational mechanical energy at the engine flywheel into thermal energy which is then dissipated to the atmosphere as simple heat by the secondary engine.

FIG. 1 is a schematic illustration of one embodiment of a degassing system. In the illustrated embodiment, the engine housings of the primary engine (1) and the secondary engine (2) can be rigidly fixed in relation to each other. The independent crankshafts of each are directly coupled together by the intermediate drive shaft (3). In this arrangement, the two engines can be positioned back-to-back as the suggested method. Modified embodiments can include displacing the engine center lines axially and employing a cog-belt drive (or other intermediate member) between the two engines. Other modifications can include or the use of a gear reduction drive, and/or a shock absorbing type flexible coupling within the drive line. Additional and/or alternative modifications will be apparent to those of skill in the art for coupling secondary engine (2) to the primary engine (1) to impose the resistance offered by that of the secondary engine (2) on that of the power output of the primary engine (1). For example, in some embodiments a semi rigid or flexible coupling member can be used between the two engines.

In the illustrated arrangement, it is primarily the element of frictional horsepower of the secondary engine (2) which is being applied as resistance to the power output of the primary engine (1). For example, in the case of the typical 500 cubic inch engine, frictional horsepower alone can be as great as 200 horsepower. Frictional horsepower is of course based on the displacement size and particular engine, and tends to be a linear function of engine RPM.

In addition to frictional horsepower, there are pumping losses; induced by restriction of either the inlet (4) or outlet (5) of the secondary engine; which imposes an additional load, that is an adjustable load, independent of frictional horsepower and independent of RPM. This affords some degree of adjustability to the appropriate horsepower loading in response to the power output characteristics of different VOC's at any given RPM; such that the maximum RPM and volumetric throughput can be maintained with minor variations in loading to accommodate the different heating value and combustion characteristics of different VOC's undergoing treatment.

Rigid coupling of crankshafts between the primary and secondary engine can be an elegant and effective embodiment. However, the internal combustion engine, whether serving as a driving or serving as a driven device, is by nature a pulsating device. So long as operation is relatively steady-state and the potential for imbalance is minimal, and, the rigid connection has been proven as a simple and effective arrangement. However, in cases where the potential for imbalance is a factor, and particularly if the operating RPM is non steady-state; this direct drive method has the potential to incur instantaneous shock loading that can be many times greater than the calculated steady-state load and can result in catastrophic mechanical failure.

Figure 2:
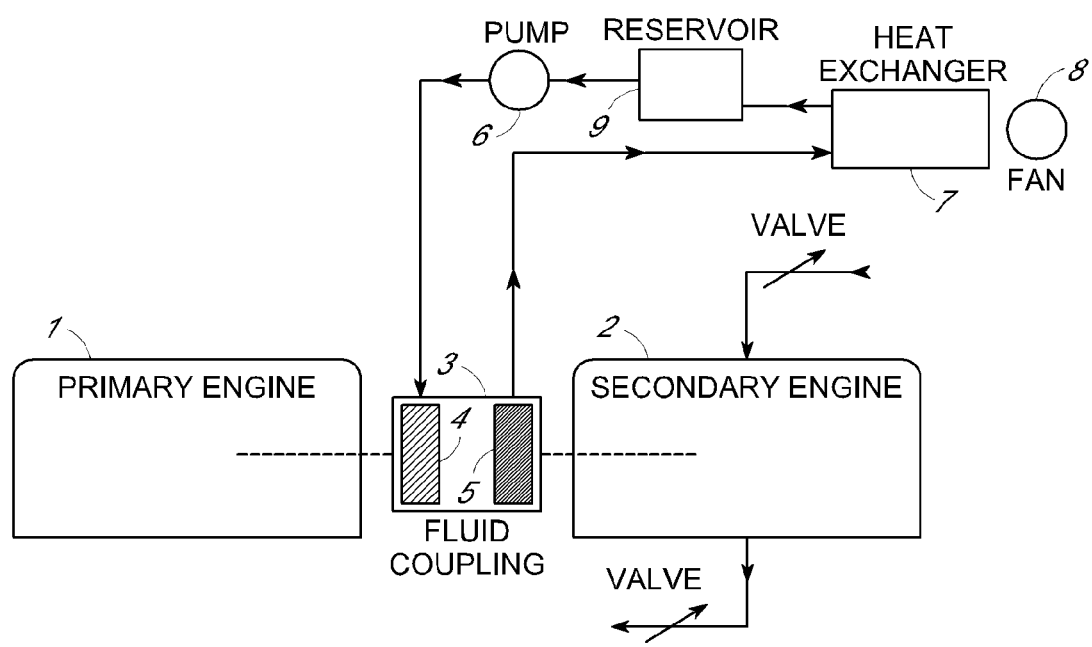
FIG. 2 is a schematic illustration of a degassing system according to another embodiment.

In applications wherein the above described issues are of a particular concern, the drive arrangement embodiment depicted in FIG. 2 can be utilized. FIG. 2 illustrates an arrangement; in which the drive shaft is of a more complex form, for example, in the illustrated arrangement the drive shaft incorporates a fluid coupling as method of power transmission Referring to the illustrated embodiment FIG. 2, the primary engine (1) and the secondary engine (2) can be firmly positioned in fixed relation to each other. The independent crankshafts of each can be coupled by a fluid coupling assembly (3) that can incorporate an impeller as the driving torus (4) and a turbine as the driven torus (5) containing a hydraulic fluid medium. The transmission of power between the primary engine (1) and the secondary engine (2) can be accomplished through the hydraulic fluid medium circulated within the housing between the two torus members. In this embodiment, the assembly can resemble the form and function of a torque convertor as commonly found within the automatic transmission of the contemporary automobile.

The liquid hydraulic medium can be circulated by pump (6) at a pressure of approximately 100 psi into the torus members that are maintained full. The influx of hydraulic medium forces spent medium from the torus to the heat exchanger (7). The heat exchanger may be of the liquid-to-air type, wherein the hot hydraulic medium dissipates its heat to the atmospheric air circulated by fan (8); or may be of the liquid-to-liquid type wherein the hydraulic medium transfers its heat to a secondary liquid medium which is circulated by pump (8). The hydraulic reservoir (9) can allow for the thermal expansion of the liquid hydraulic medium and affords also the opportunity for any developed gas bubbles to coalesce from the liquid before being recirculated.

The selection of size, blade pitch, liquid medium and heat exchanger best suited for the particular application are straightforward engineering calculations known to those skilled in the art of power transmission and hydraulic engineering. As a brief overview: the starting point is to determine the amount of horsepower to be consumed at the flywheel of the power producing engine. This is a [FORCE X TIME] dimension, which is converted to convenient units of [BTU X TIME]. The selected liquid hydraulic medium, and the rate at which this is circulated through the system, should be sufficient to avoid the instantaneous superheating of the liquid hydraulic medium to its temperature of decomposition associated with the heat generated from being worked upon between the torus members. The sizing of the heat exchanger, whether the liquid-to-air type, or the liquid-to-liquid transfer to a medium such as running water; should be so sized that the [BTU X TIME] generated within the torus members is at least equaled and preferably exceeded by some margin such to return the circulated hydraulic medium to its ambient operating temperature. The volume of the hydraulic reservoir should be so sized as to accommodate the volumetric expansion of the hydraulic medium; but also to afford sufficient residence time for the coalescing of any accumulated gas bubbles before the medium is recirculated.

All of these calculations are within the realm of hydraulic engineer skilled in the art; and must be uniquely performed based upon the quantity of horsepower to be transferred at the flywheel of the power producing engine for the particular application.

It should be appreciated that while the illustrated embodiment utilizes a torque convertor as commonly found within the automatic transmission of the contemporary automobile, in other embodiments a different type of torque converter can be used, for example, a torque converter that utilizes magnets, gels, exotic materials etc.

An advantage of the embodiments described herein is that that the abundance of mechanical energy produced at the flywheel of the primary engine employed in vapor destruction applications is transferred to a secondary engine whereby it is consumed by frictional energy and transformed into thermal energy and finally dissipated to the atmosphere as simple heat energy.

Figure 3:
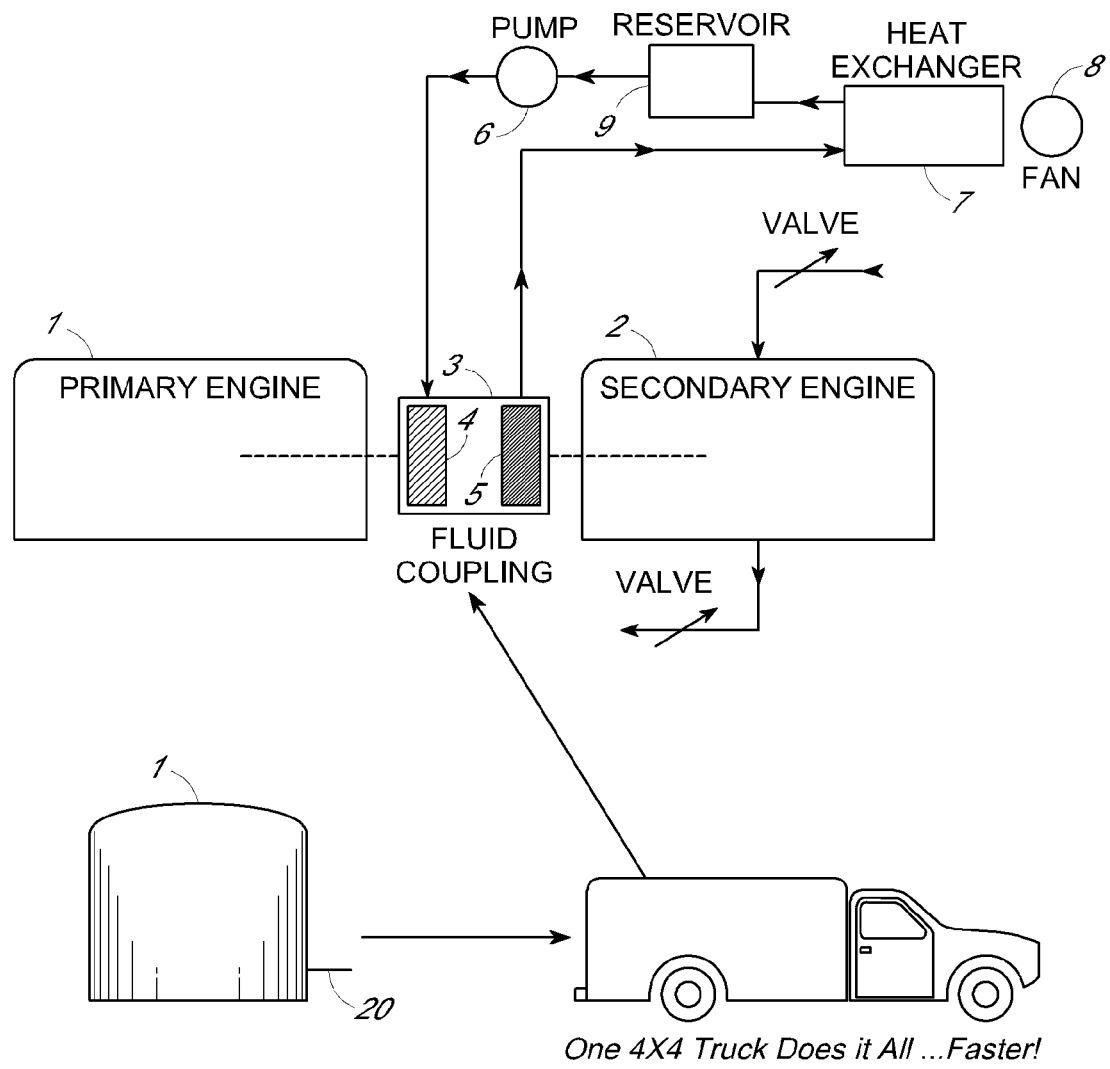
FIG. 3 is schematic illustration of embodiment of FIG. 2 mounted on a mobile device and connected to storage tank.

With reference now to FIG. 3, there is shown an above-ground storage tank 1 for degassing or removal of VOC's therefrom. Degassing may occur before, during and/or after tank cleaning or during tank refilling. At noted above, it should also be understood that the systems and methods described herein can be utilized with other degassing or VOC removal operations. For example, they can be utilized for degassing underground storage tanks, barges, tankers, etc. They can also be utilized in controlling emissions from refineries and petrochemical processing facilities. They may also find utility in reducing other types of emissions besides VOCs.

In the embodiment of FIG. 3, the gaseous, Volatile Organic Compounds (VOC's) are directed by piping or hose 20 to the degassing system, which in the illustrated embodiment is the degassing system described with reference to FIG. 2. As shown in FIG. 2, the degassing system of the illustrated can made portable or mobile by mounting the device on a truck or similar device. In other embodiments, the degassing system can be stationary or semi-mobile. In some embodiments, a trailer, stationary frame or skid mount can be used to mount the device.

With reference to FIG. 3 above, in certain embodiments, a knock out drum (or similar device) for removing heavy liquid condensation, one or more air filters, flame arrestors and/or a turbo charger can be added upstream primary engine. In certain embodiments, a thermo oxidizer unit and/or a catalytic converter can be added to treat the exhaust downstream of the primary engine.

As described above, the VOC's can be burned as fuel in the primary internal combustion engine, being converted from hazardous pollutants into carbon dioxide and water. In some embodiments, the exhaust gases from the primary internal combustion engine can be directed then directed through piping (not shown), a catalytic converter (not shown) where any nitrogen oxides, carbon monoxides or other unwanted hydrocarbon products are converted to less hazardous gases for discharge as clean exhaust. In additional embodiments, additional or alternative emission abatement devices and/or additives can be added to the exhaust stream after the primary internal combustion engine and/or to the intake stream before the primary combustion stream.

In one example mode of operation, the primary engine can be initially run on the VOC's from the tank 1 (or other source). Often the fuel mixture will be too rich and, in such cases, the mixture can be diluted with air. As the VOC's in the tank 1 (or other source) are consumed, the mixture may become lean at which time a supplemental fuel (e.g., methane, butane, natural gas, etc.) can be added to the intake mixture.

As described above, in the illustrated embodiments, the primary and secondary engines are reciprocating internal combustion engines. However, it is contemplated that other types of engines and/or internal combustion engines could be utilized in modified embodiments.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments can be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited

What is claimed is:

1. A system for controlling emissions of VOC's by combustion of said VOC's in an internal combustion engine, the system comprising a driving device that is a primary internal combustion engine that is connected to a source of VOC's and comprises a crankshaft and a driven device that is a secondary internal combustion engine that also comprises a crankshaft, wherein the crankshafts of the primary internal combustion engine and the secondary internal combustion engine are coupled together and configured such that, throughout operation of the primary internal combustion engine, the driven secondary internal combustion engine imposes a resistive load on the primary internal combustion engine and the crankshafts of the primary internal combustion engine and the secondary combustion engine remain coupled together.

2. The system of claim 1, wherein the crankshafts of the primary internal combustion engine device and secondary internal combustion engine are coupled together through a rigid connection.

3. The system of claim 1, wherein the crankshafts of the primary internal combustion engine and secondary internal combustion engine are coupled together through a fluid coupling.

4. The system of claim 3, wherein the fluid coupling comprises an automatic transmission.

5. The system of claim 1, further comprising a truck, trailer, stationary frame or skid mount that carries the primary and secondary internal combustion engines.

6. The system of claim 1, wherein the resistive load is such that the primary internal combustion engine operates at or close to its full volumetric flow potential.

7. The system of claim 1, wherein the resistive load is a function of the rotational speed of the secondary internal combustion engine.

8. The system of claim 1, wherein the resistive load is adjustable to accommodate different characteristics of the VOCs being burned.

9. The system of claim 8, wherein the resistive load is adjusted by at least one of varying an inlet or an outlet of the secondary internal combustion engine.

10. The system of claim 1, wherein the resistive load is constantly applied while the primary internal combustion engine and secondary internal combustion engine are coupled.

11. The apparatus of claim 1, wherein the resistive load imposed by the second internal combustion engine is equivalent to an output of the primary internal combustion engine.

12. A method of controlling emissions of VOC's, the method comprising transporting VOC's to a primary internal combustion engine, into the primary internal combustion engine as a fuel thereof, burning said VOC's in said engine as the fuel, rotating throughout operation of the primary internal combustion engine a crankshaft of a secondary internal combustion engine with a crankshaft of the primary internal combustion engine, and continuously imposing a resistive load on the primary internal combustion engine via rotation of the crankshaft of the secondary internal combustion engine wherein the secondary internal combustion engine is driven by the primary internal combustion engine and the crankshafts of the primary internal combustion engine and the secondary combustion engine remain coupled together.

13. The method of claim 12, wherein the step of imposing a resistive load comprises imposing a resistive load configured to allow the primary internal combustion engine to operate at or close to its full volumetric flow potential.

14. The method of claim 12, further comprising adjusting the resistive load to accommodate different characteristics of the VOCs being burned.

15. The method of claim 14, wherein the step of adjusting the resistive load comprises adjusting at least one of an inlet or an outlet of the secondary internal combustion engine.

16. The method of claim 12, further comprising: coupling the primary internal combustion engine and the secondary internal combustion engine, wherein the step of imposing a resistive load occurs throughout the duration of coupling between the primary internal combustion engine and the second internal combustion engine.

17. The method of claim 12, wherein the resistive load imposed by the second internal combustion engine is equivalent to an output of the primary internal combustion engine.

18. A mobile anti-pollution apparatus, for the reduction of hydrocarbon emissions, comprising:
a mobile platform upon which is mounted a system comprising a primary internal combustion engine that is connected to a source of VOC's and comprises a crankshaft and a secondary internal combustion engine that also comprises a crankshaft, wherein the crankshafts of the primary and secondary internal combustion engines are coupled together such that, during operation of the primary internal combustion engine, the secondary internal combustion engine is driven by and continuously imposes a resistive load on the primary internal combustion engine and the crankshafts of the primary internal combustion engine and the secondary combustion engine remain coupled together.

19. The apparatus of claim 18, wherein the resistive load is such that the primary internal combustion engine operates at or close to its full volumetric flow potential.

20. The apparatus of claim 18, wherein the resistive load is constantly applied while the primary internal combustion engine and secondary internal combustion engine are coupled.

21. A method of controlling emissions of VOC's, the method comprising transporting VOC's to a primary internal combustion engine, into the primary internal combustion engine as a fuel thereof, burning said VOC's in said engine as the fuel, rotating throughout operation of the primary internal combustion engine a crankshaft of a secondary internal combustion engine with a crankshaft of the primary internal combustion engine, and continuously imposing a resistive load on the primary internal combustion engine that is equivalent to an output of the primary internal combustion engine generated via rotation of the crankshaft of the secondary internal combustion engine wherein the secondary internal combustion engine is driven by the primary internal combustion engine.

22. The method of claim 21, wherein the step of imposing a resistive load comprises imposing a resistive load that is equivalent to an output of the primary internal combustion engine comprises imposing a resistive load configured to allow the primary internal combustion engine to operate at or close to its full volumetric flow potential.

23. The method of claim 21, further comprising adjusting the resistive load to accommodate different characteristics of the VOC's being burned.

24. The method of claim 23, wherein the step of adjusting the resistive load comprises adjusting at least one of an inlet or an outlet of the secondary internal combustion engine.

25. A system for controlling emissions of VOC's by combustion of said VOC's in an internal combustion engine, the system comprising a driving device that is a primary internal combustion engine that is connected to a source of VOC's and comprises a crankshaft and a driven device that is a secondary internal combustion engine that also comprises a crankshaft, wherein the crankshafts of the primary internal combustion engine and the secondary internal combustion engine are coupled together and configured such that, during operation of the primary internal combustion engine, the driven secondary internal combustion engine imposes a resistive load on the primary internal combustion engine that is equivalent to an output of the primary internal combustion engine.

* * * * *

UNITED STATES PATENT AND TRADEMARK OFFICE
CERTIFICATE OF CORRECTION

| | | |
|---|---|---|
| PATENT NO. | : 8,936,011 B2 | Page 1 of 1 |
| APPLICATION NO. | : 13/409546 | |
| DATED | : January 20, 2015 | |
| INVENTOR(S) | : Bruns | |

It is certified that error appears in the above-identified patent and that said Letters Patent is hereby corrected as shown below:

In the specification

Column 1 line 59, Change "rating ;" to --rating;--.

Column 4 lines 60-61, Change "transmission" to --transmission.--.

Column 5 lines 56-57, Change "that that" to --that--.

In the claims

Column 7 line 47, Claim 11, Change "apparatus" to --system--.

Column 8 lines 11-12, Claim 16, Change "second" to --secondary--.

Signed and Sealed this
Twentieth Day of October, 2015

Michelle K. Lee
*Director of the United States Patent and Trademark Office*